United States Patent [19]

Stapley et al.

[11] B 3,914,158

[45] Oct. 21, 1975

[54] ANTIBIOTIC PRODUCTION

[75] Inventors: Edward O. Stapley, Metuchen, N.J.; Justo M. Mata, Madrid, Spain

[73] Assignee: Merck & Co., Inc., Rahway, N.J.

[22] Filed: June 6, 1973

[21] Appl. No.: 367,661

[44] Published under the Trial Voluntary Protest Program on January 28, 1975 as document no. B 367,661.

[52] U.S. Cl. ............................................. 195/80 R
[51] Int. Cl.$^2$ .......................................... C12D 9/00
[58] Field of Search..... 195/28 N, 80 R, 96, DIG. 1; 51/75

[56] References Cited
UNITED STATES PATENTS

| | | | |
|---|---|---|---|
| 3,116,222 | 12/1963 | Rao et al. | 195/80 R |
| 3,801,464 | 4/1974 | Gorman et al. | 195/80 R |

Primary Examiner—Lionel M. Shapiro
Assistant Examiner—R. B. Penland
Attorney, Agent, or Firm—Julian S. Levitt; J. Jerome Behan

[57] ABSTRACT

Production of antibiotics cephamycin C and toyocamycin by fermentation of Streptomyces albogriseolus.

10 Claims, No Drawings

ANTIBIOTIC PRODUCTION

This invention relates to the novel production by fermentation of useful antibiotic substances that heretofore have been reported in the prior art. More particularly, this invention relates to the preparation, by cultivating under controlled conditions a hitherto undescribed strain of *Streptomyces albogriseolus*, of the known useful antibiotics:

a. toyocamycin [Merck Index, eighth Ed., 1968, pages 1062–1063] and b. 7β-(D-5-amino-5-carboxyvaleramido)-3-(carbamoyloxymethyl)-7-methoxy-3-cephem-4-carboxylic acid, hereinafter referred to as cephamycin C [Belgium Pat. No. 764,160; J.A.C.S. 93, May 5, 1971, pgs. 2308–2312 (compound 4); Chap. 15*Cephalosporins and Penicillins, Chemistry and Biology*, ed. by Flynn, Academic Press, N.Y. (1972) (compound 5); Stapley et al., Antibiotic Agents and Chemotherapy 2, pgs. 122–131 (1972)].

The antibiotics indicated above are co-produced by cultivating under controlled conditions a new strain of actinomycete designated at MA-4256 in the culture collection of Merck & Co., Inc., Rahway, N.J. The novel organism capable of producing the antibiotic products has been placed on permanent deposit without restriction as to availability with the culture collection of the Northern Utilization Research and Development Division, Agricultural Research Service, U.S. Department of Agriculture (Formerly Northern Regional Research Laboratories), Peoria, Ill. 61604 and is available to the public under culture No. NRRL 5735.

The novel microorganism utilized in the practice of the invention is a previously unknown strain of a specie of actinomycete known as *Streptomyces albogriseolus*. The original isolate was obtained from soil as a single colony on an agar plate. It may be grown in any one of the media described below.

The cultural characteristics of MA-4256 have been compared with culture descriptions of known species in *Bergey's Manual of Determinative Bacteriology*, seventh Edition (Williams and Wilkins, 1957), *The Actinomycetes*, Vol. 2, S. A. Waksman (Williams and Wilkins, 1961), "Cooperative Description of Type Cultures of *Streptomyces*", Elwood B. Shirling and David B. Gottlieb, Part I, International Journal of Systematic Bacteriology 17, 315 (1967), Part II, 18, 69 (1968), Part III, 18, 279 (1968), and Part IV, 19, 391 (1969).

Based on this comparison the culture was found to belong to the species *Streptomyces albogriseolus* as described by Waksman. There is a slightly different response in carbohydrate utilization from that given in the Shirling and Gottlieb study. MA-4256 utilized glucose, sucrose, xylose, inositol, mannitol, fructose and raffinose for growth and grew poorly on rhamnose. The culture described in the cooperative study of Shirling and Gottlieb utilized glucose, xylose, sucrose (though growth was less abundant than the others), inositol, mannitol, fructose and rhamnose but showed no growth or only a trace of growth on raffinose. However, these differences in carbohydrate utilization are considered to be a strain characteristic insufficient to determine a new species.

Accordingly, this culture has been named *Streptomyces albogriseolus*, strain MA-4256.

The following is a general description of the organism based on the diagnostic characteristics observed. All of the readings reported below were taken after 3 weeks incubation at 28°C., except where otherwise noted. The pH of the media used in these studies was approximately neutral, namely, 6.8 to 7.2. The physiological tests were run at the end of 7 and 21 days. The colors used in the description are in accordance with the definitions of the "Color Harmony Manual", Fourth Edition, 1958, Container Corporation of America.

Cultural Characteristics of MA-4256

Morphology:
Sporophores form many closed, compact spirals of more than 10 spores each. Spores are spherical to slightly oval—$0.9\mu$ diameter and $0.9\mu$ wide $\times$ $1.2\mu$ long. Sporulation seen on Czapek-Dox agar and synthetic starch agar.

Tomato-Paste-Oatmeal Agar:
Vegetative growth--Reverse--Medium brownish-orange.
Aerial mycelium--Moderate, white.
Soluble pigment--None.

Czapek-Dox Agar:
Vegetative growth--Reverse--grayed cream.
Aerial mycelium--Moderate, grayish white to pale gray edged with medium gray. Good sporulation.
Soluble pigment--None.

Egg Albumin Agar:
Vegetative growth--Reverse-tannish yellow.
Aerial mycelium--Moderate, cream-colored.
Soluble pigment--Very light brown.

Glycerol-Asparagine Agar:
Vegetative growth--Reverse--medium golden yellow.
Aerial mycelium--Cream-colored.
Soluble pigment--Very light brown.

Synthetic Starch Agar:
Vegetative growth--Reverse--tannish yellow.
Aerial mycelium--Moderate, grayish white to pale gray edged with medium gray. Sporulation good.
Soluble pigment--Very light brown.

Yeast Extract-Dextrose + Salts Agar:
Vegetative growth--Tan.
Aerial mycelium--Moderate, white.
Soluble pigment--None.

Nutrient Agar:
Vegetative growth--Cream to tan.
Aerial mycelium--None.
Soluble pigment--None.

Skim Milk Agar:
Vegetative growth--Tan.
Aerial mycelium--None.
Soluble pigment--Medium brown.
Hydrolysis of casein--Good.

Litmus Milk:
Vegetative growth--Moderate growth ring, tan.
Peptonization, becoming slightly alkaline.

Nutrient Tyrosine Agar:
Vegetative growth--Tan.
Aerial mycelium--None.
Soluble pigment--None.
No decomposition of tyrosine.

Calcium Malate Agar:
Vegetative growth--Reverse--cream-colored.
Aerial mycelium--White with a pale yellowish tone.
Soluble pigment--None.
Utilization of malate.

Nutrient Starch Agar:
Vegetative growth--Tan.

Aerial mycelium--None.
Soluble pigment--None.
Hydrolysis of starch--Good.
Nutrient Gelatin Agar:
  Vegetative growth--Tan.
  Aerial mycelium--Sparse, whitish.
  Soluble pigment--None.
  Liquefaction of gelatin--Good.
Peptone-Iron-Yeast Extract Agar:
  Vegetative growth--Tan.
  Aerial mycelium--None.
  Soluble pigment--None.
  No hydrogen sulfide produced.
  Melanin negative.
Temperature Range:
  28°C. - Good Growth
  37°C. - Moderate Growth
  50°C. - No Growth Carbohydrate Utilization: The *Streptomyces albogriseolus* culture (MA-4256) was also tested for its ability to utilize or assimilate various carbohydrates by growing the microorganism in a basal synthetic medium (T. G. Pridham and D. Gottlieb, Journal of Bacteriology, Vol. 56, page 107, 1948) which contains 1% of the carbohydrate at 28°C. for 3 weeks. The following table indicates the utilization or assimilation of these carbohydrate sources by the *Streptomyces albogriseolus* culture (MA-4256). The explanation of the symbols in the table are as follows: + indicates good growth, ± indicates poor growth and − indicates no growth on the particular carbohydrate.

Carbohydrate Utilization
(Pridham-Gottlieb Basal Medium + 1% Carbohydrate)

| | |
|---|---|
| Glucose | + |
| Arabinose | + |
| Cellulose | − |
| Fructose | + |
| Inositol | + |
| Lactose | + |
| Maltose | + |
| Mannitol | + |
| Mannose | + |
| Raffinose | + |
| Rhamnose | ± |
| Sucrose | + |
| Xylose | + |

The foregoing description of the novel strain of *Streptomyces albogriseolus* is simply illustrative of the type of strains of microorganisms which can be used, and it should be understood that the present invention is not limited to organisms meeting these particular descriptions. This invention includes the use of other microorganisms, including strains of actinomycetes either isolated from nature or obtained by mutation as, for example, those obtained by natural selection or those produced by mutating agents, for example, X-ray irradiation, ultraviolet irradiation, nitrogen mustards and the like which, under suitable conditions, will afford the antibiotic products.

The antibiotics toyocamycin and cephamycin C are produced during the aerobic fermentation of suitable aqueous nutrient mediums under controlled conditions via inoculation with the *Streptomyces albogriseolus* culture MA-4256. Aqueous mediums such as those employed for the production of other antibiotics are also suitable for producing the antibiotics described above. Such mediums contain sources of carbon and nitrogen assimilable by the microorganism and inorganic salts.

In general, carbohydrates such as sugars, for example, glucose, arabinose, maltose, xylose, mannitol and the like and starches such as grains, for example, oats, rye, corn starch, corn meal and the like can be used either alone or in combination as sources of assimilable carbon in the nutrient medium. The exact quantity of the carbohydrate source or sources utilized in the medium depend in part upon the other ingredients of the medium but, in general, the amount of carbohydrate usually varies between about 1% and 6% by weight of the medium. These carbon sources can be used individually or several such carbon sources may be combined in the medium. In general, any proteinaceous material may be used as a nitrogen source in the fermentation process. Suitable nitrogen sources include, for example, yeast hydrolysates, yeast autolysate, soybean meal, hydrolysates of casein, corn steep liquor, distiller's solubles or tomato paste and the like. The sources of nitrogen, either alone or in combination, are used in amounts ranging from about 0.2 to 6% by weight of the aqueous medium. Among the nutrient inorganic salts which can be incorporated in the culture media are the customary salts capable of yielding sodium, potassium, ammonium, calcium, phosphate, sulfate, chloride, carbonate, and like ions.

Minor elements necessary for optimum growth and development of the organism can also be included in the culture medium. Such trace elements commonly occur as impurities in the other constituents of the medium in amounts sufficient to meet the growth requirements of the actinomycete employed in this invention.

Typical of the media which are suitable to be employed in the practice of the invention are those listed below. These media and others described in the examples which follow are merely illustrative of the wide variety of media which may be employed and are not intended to be limitative.

| | | |
|---|---|---|
| Medium I: | | |
| Difco Yeast Extract | 10.0 | g. |
| Glucose | 10.0 | g. |
| Phosphate Buffer* | 2.0 | ml. |
| MgSO$_4$ . 7H$_2$O | 0.05 | g. |
| Distilled water | 1000.0 | ml. |
| Difco Agar | 25.0 | g. |
| Phosphate Buffer:* | | |
| KH$_2$PO$_4$ | 91.0 | g. |
| NA$_2$HPO$_4$ | 95.0 | g. |
| Distilled water | 1000.0 | ml. |
| Medium II: | | |
| Beef Extract | 3.0 | g. |
| NZ Amine* | 10.0 | g. |
| Dextrose | 10.0 | g. |
| NaCl | 5.0 | g. |
| Distilled H$_2$O | 1000.0 | ml. |
| pH adjusted to 7.2 with NaOH | | |
| * an enzymatic digested casein | | |
| Medium III: | | |
| Dextrose | 10.0 | g. |
| Asparagine | 1.0 | g. |
| K$_2$HPO$_4$ | 0.1 | g. |
| MgSO$_4$ . 7H$_2$O | 0.5 | g. |
| Yeast Extract | 0.5 | g. |
| Trace Element Mix No. 2* | 10.0 | ml. |
| Distilled H$_2$O | 1000.0 | ml. |
| pH adjusted to 7.2 with NAOH | | |
| Trace Element Mix No. 2:* | | |
| FeSO$_4$ · 7H$_2$O | 1.0 | g. |
| MnSO$_4$ . H$_2$O | 1.0 | g. |
| CuCl$_2$ . 2H$_2$O | 25.0 | mg. |
| CaCl$_2$ | 100.0 | mg. |
| H$_3$BO$_3$ | 56.0 | mg. |
| (NH$_4$)$_6$MO$_7$O$_{24}$ . 4H$_2$O | 19.0 | mg. |
| ZnSO$_4$ . 7H$_2$O | 200.0 | mg. |

-Continued

| | |
|---|---|
| Distilled H$_2$O | 1000.0 ml. |
| Medium IV: | |
| V8 Juice | 100.0 ml. |
| Staley's 4S Soybean Meal | 20.0 g. |
| Dextrose | 2.0 g. |
| Agar | 25.0 g. |
| Distilled H$_2$O | to 1000.0 ml. |
| pH 7.9–8.0 | |
| Medium V: | |
| Yeast Autolysate (Ardamine) | 10.0 g. |
| Glucose | 10.0 g. |
| Phosphate Buffer* | 2.0 ml. |
| MgSO$_4$ . 7H$_2$O | 0.5 g. |
| Distilled H$_2$O | 1000.0 ml. |
| pH adjusted to 6.5 using NaOH | |
| Phosphate Buffer Solution:* | |
| KH$_2$PO$_4$ | 91.0 g. |
| Na$_2$HPO$_4$ | 95.0 g. |
| Distilled H$_2$O | 1000.0 ml. |
| Medium VI: | |
| Corn Steep Liquor (wet basis) | 40.0 g. |
| Dextrose | 20.0 g. |
| NaCl | 2.5 g. |
| MgSO$_4$ . 7H$_2$O | 0.5 g. |
| Polyglycol 2000 | 0.25% by volume (add to each flask invididually) |
| Distilled H$_2$O | 1000.0 ml. |
| pH adjusted to 7.0 with NaOH | |

Medium VII:

| | Seed | Production |
|---|---|---|
| L-Asparagine | 5.0 g. | 5.0 g. |
| L-Histidine | 4.0 g. | 4.0 g. |
| DL-Phenylalanine | — | 2.0 g. |
| Monosodium glutamate | — | 1.5 g. |
| NaCl | 5.0 g. | 5.0 g. |
| K$_2$HPO$_4$ | 2.0 g. | 2.0 g. |
| CaCl$_2$ . 2H$_2$O | 0.4 g. | 0.4 g. |
| MnSO$_4$ . H$_2$O | 0.1 g. | 0.1 g. |
| FeSO$_4$ . 7H$_2$O | 0.1 g. | 0.1 g. |
| ZnSO$_4$ . 7H$_2$O | 0.05 g. | 0.05 g. |
| MgSO$_4$ . 7H$_2$O | 1.0 g. | 1.0 g. |
| Glycerol | 20.0 g. | 20.0 g. |
| Sucrose | 2.5 g. | 2.5 g. |
| Distilled H$_2$O | *1000.0 ml. | **1000.0 ml. |

*pH adjusted to 7.0 with NaOH
**pH adjusted to 7.1 with NaOH

| | |
|---|---|
| Medium VIII: | |
| Meat Extract | 0.3% |
| NaCl | 0.5% |
| NZ Amine | 1% |
| Dextrose | 1% |
| pH 7.0 | |
| Medium IX: | |
| Amber Yeast No. 300 | 10.0 g. |
| Distiller's Solubles | 20.0 g. |
| Dextrose | 10.0 g. |
| Distilled Water | 1000.0 ml. |
| pH 7.0 | |
| Medium X: | |
| Staley's 4S-Soybean Meal | 30.0 g. |
| Distiller's Solubles | 7.5 g. |
| Cerelose | 20.0 g. |
| NaCl | 2.5 g. |
| CaCO$_3$ (after pH to 7.0) | 10.0 g. |
| Distilled Water | 1000.0 ml. |
| Medium XI: | |
| Amber Yeast No. 300 | 10.0 g. |
| Distiller's Solubles | 20.0 g. |
| Distilled Water | 1000.0 ml. |
| pH 7.0 | |

The fermentation is carried out at temperatures ranging from about 20°C. to 37°C., but for optimum results it is preferable to conduct the fermentation at temperatures of from about 24°C. to 32°C. The pH of the nutrient mediums suitable for growing the Streptomyces albogriseolus culture (MA-4256) and producing the antibiotic products should be in the range of from about 6.0 to about 8.0.

Fermentation is conveniently carried out by inoculating a suitable nutrient medium with the antibiotic-producing culture and permitting the fermentation to proceed at a constant temperature of about 28°C. on a shaker for several days. At the end of the incubation period the mycelium is removed and the supernatant liquid is assayed.

In practice, this fermentation is conducted in a sterilized flask via a one, two, three or four stage seed development. The nutrient medium for the seed stage may be any suitable combination of carbon and nitrogen sources, as for example, any one of Media I-XI described above. The seed flask is shaken in a constant temperature chamber at about 28°C. for a period of from 1 to about 3 days and a portion of the resulting growth is used to inoculate either a second stage seed or the production medium. Intermediate stage seed flasks, when used, are developed in essentially the same manner, that is, a portion of the contents of the flask are used to inoculate the production medium, the inoculated flasks are shaken at a constant temperature for several days and at the end of the incubation period the contents of the flasks are centrifuged to remove the mycelium. The supernatant liquid or broth is then concentrated and purified to afford the antibiotic materials.

For larger scale work, it is preferable to conduct the fermentation in suitable tanks provided with an agitator and a means of aerating the fermentation medium. According to this method, the nutrient medium is made up in the tank and sterilized by heating at temperatures of up to about 120°C. Upon cooling, the sterilized medium is inoculated with the producing culture and the fermentation is permitted to proceed for a period of several days as, for example, from 2 to 4 days while agitating and/or aerating the nutrient medium and maintaining the temperature at about 28°C. Through changes in inoculum development and changes in production medium, it is also possible to achieve a several-fold improvement in production and increase the potency of the antibiotics.

The concentration of antibiotic activity in the culture medium can be followed readily during the fermentation period by testing samples of the culture medium for their inhibitory activity against the growth of organisms known to be inhibited by the presence of the antibiotics produced in accordance with the practice of the invention. The organisms Vibrio percolans ATCC 8461 and Pseudomonas stutzeri ATCC 11607 have been found to be useful for this purpose. The testing of the samples can be carried out by the well-known turbidometric or disc-plate methods.

The examples which follow illustrate the procedures of this invention. However, the examples are illustrative only and it should be apparent to those having ordinary skill in the art that this invention includes other functionally equivalent products and methods for their preparation. Therefore, any modification of representative procedures exemplified which results in the formation of an identical product should be construed as constituting an analogous method. The claimed process is capable of wide variation and modification and, therefore, any minor departure therefrom or extension thereof is considered as being within the skill of the artisan and as falling within the scope of this invention.

EXAMPLE 1

A lyophilized tube of Streptomyces albogriseolus culture (MA-4256) was opened aseptically and the organism transferred to a sterile slant of Medium A.

The Medium A has the following composition:

| | | |
|---|---|---|
| Difco Agar | 25.0 | g. |
| Yeast Autolysate (Ardamine) | 10.0 | g. |
| Glucose | 10.0 | g. |
| Phosphate Buffer* | 2.0 | g. |
| $MgSO_4 \cdot 7H_2O$ | 0.05 | g. |
| Distilled Water | 1000.0 | ml. |
| pH 6.5 (adjust using a NaOH) | | |
| Phosphate Buffer:* | | |
| $KH_2PO_4$ | 91.0 | g. |
| $Na_2HPO_4$ | 95.0 | g. |
| Distilled Water | 1000.0 | ml. |

The slant was incubated for seven days at 28°C. The slant was stored in the cold for 2 weeks, at which time a sterile slant of Medium B was inoculated with a portion of the growth from the Medium A slant.

The Medium B has the following composition:

| | | |
|---|---|---|
| Difco Agar | 25.0 | g. |
| Corn Starch* | 15.0 | g. |
| L-Asparagine | 1.0 | g. |
| Monosodium Glutamate | 0.5 | g. |
| $K_2HPO_4$ | 0.1 | g. |
| $MgSO_4 \cdot 7H_2O$ | 0.5 | g. |
| Trace Element Mix No. 2** | 10.0 | ml. |
| Difco Yeast Extract | 0.5 | g. |
| NaCl | 5.0 | g. |
| Distilled Water | 1000.0 | ml. |
| pH: adjust to 7.0 using NaOH | | |
| Clinton Co. Corn Starch* | | |
| Trace Element Mix No. 2:** | | |
| $FeSO_4 \cdot 7H_2O$ | 1000 | mg. |
| $MnSO_4 \cdot 4H_2O$ | 1000 | mg. |
| $CuCl_2 \cdot 2H_2O$ | 25 | mg. |
| $CaCl_2$ | 100 | mg. |
| $H_3BO_3$ | 56 | mg. |
| $(NH_4)_6Mo_7O_{24} \cdot 4H_2O$ | 19 | mg. |
| $ZnSO_4 \cdot 7H_2O$ | 200 | mg. |
| Distilled Water | 1000 | ml. |

The Medium B slant was incubated at 28°C. for 1 week.

A portion of the growth from the Medium B slant was used to inoculate three 250 ml. baffled Erlenmeyer flasks each containing 50 ml. of Medium A (sans Difco Agar). The seed flasks were then shaken on a 220 rpm rotary shaker with a 2-inch throw at 28°C. for 3 days.

The broth from the three seed flasks was aseptically pooled and seven ml. aliquots of this growth were then transferred to fifteen 2-liter Erlenmeyer flasks each containing 200 ml. of Medium C of the following composition:

| | | |
|---|---|---|
| Autolysed Yeast; BYF series 300 (Amber Labs., Inc.) | 10.0 | g. |
| Distiller's Solubles (Brown & Forman Co.) | 20.0 | g. |
| Dextrose | 10.0 | g. |
| $CaCO_3$ | 3.0 | g. |
| Distilled Water | 1000 | ml. |
| pH: adjust to 7.0 using NaOH | | |

The 2-liter flasks were shaken at 28°C. on a 220 rpm rotary shaker with a 2-inch throw for 4 days. At the end of the incubation period the contents of the 15 flasks were combined.

A sample of the pooled broth was centrifuged to remove the mycelium and the supernatent liquid assayed as follows:

The presence and concentration of cephamycin C in the broth was determined by standard agar diffusion assays performed with 0.5-inch filter paper discs soaked in the broth and set on the surface of assay plates containing 10 ml. of nutrient agar (Difco) plus 0.2% yeast extract (Difco) medium seeded with the bacterial inoculum. The assay organism employed was Vibrio percolans (ATCC 8461). Filter paper discs are immersed into the diluted broths and placed on the surface of agar-containing Petri dishes that had been inoculated with the assay organism Vibrio percolans (ATCC 8461). Also placed on these Petri dishes are discs that had been dipped previously in standard solutions containing known concentrations of cephamycin C. The discs were incubated overnight at 28°C. and the diameters of the zones of inhibition recorded. The concentration of cephamycin C in the fermented broth is calculated by interpolation from the standard curve which relates zone diameter with the known concentrations of standard cephamycin C solutions. The assays of broth harvested after fermentation for 4 days showed an inhibition zone of 31.5 mm. diameter on plates seeded with Vibrio percolans (ATCC 8461). The broth potency was 42 µg/ml. as cephamycin C.

EXAMPLE 2

Isolation of Cephamycin C

The filtered broth (2 liters) obtained in accordance with Example 1 (pH 8.0) was adsorbed on 200 ml. of a strongly basic anion exchange resin having a styrenedivinylbenzene matrix (Dowex 1 × 2 chloride cycle resin) and eluted with 5% aqueous sodium chloride. The eluate was collected in 100 ml. fractions and assayed as described above. The active fractions of Dowex 1 eluate were combined and adjusted to pH 4.0 with dilute hydrochloric acid and adsorbed on 250 ml. of a strongly acidic cation exchange resin of the sulfonate type having a styrene-divinylbenzene matrix (Dowex 50 × 2 hydrogen cycle resin) at 25 ml./minute. The column was washed with 500 ml. of water and then eluted with 2% pyridine until the pH of the column effluent rose to pH 7 (1000 ml.). Assays of the spent fraction and eluate indicated none of the activity in the spent and 90% in the eluate. The eluate was identified as the pyridinium salt of cephamycin C.

The Dowex 50 eluate (700 ml.) was adjusted to pH 8.2 with dilute sodium hydroxide and concentrated to remove pyridine resulting in a final volume of 50 ml. The pH was then adjusted to 7.0 with dilute HCl and further concentrated to dryness to yield 780 mg. of crude product.

The crude product from Dowex 50 was dissolved in 6 ml. of $H_2O$ for chromatography on Dowex 1 × 2 resin buffered with 0.1M pyridine/HCl pH 5.0.

To a 1.4 × 87 cm. (134 ml.) resin bed, 3 ml. of sample was applied and developed with the above buffer at 1 ml./min. collecting 5 ml. fractions. A Mecco-matic differential refractometer was used to monitor the effluent stream.

A single peak of bioactivity against Vibrio percolans ATCC 8461 which coincided with a refractive index peak was observed between fractions 76 and 120 with the maximum at fraction 84. The $K_D$ was calculated as 4.6 using the formula $$K_D = (Ve - 0.4 \ (Vr))/0.6 \ (Vr)$$

which is in good agreement with previously observed values for cephamycin C.

Fractions 81 to 101 were combined and the pH adjusted to 8.2 with dilute sodium hydroxide. The solution was concentrated to a small volume to remove pyridine and the pH adjusted from 7.5 to 7.0 with HCl.

The solution was then concentrated to dryness, yielding a 775 mg. residue.

The above residue was taken up in 1.5 ml. of 1% n-butyl alcohol and desalted using a 1.4 × 84.5 cm. column of Bio-Gel P-2. The gel was developed with 1% n-butyl alcohol at 0.25 ml./min. collecting 2 ml. fractions. The effluent stream was monitored as previously stated. The desired fractions were located by bio-assay against *Vibrio percolans* ATCC 8461. Fractions 39 to 44 were combined and concentrated to dryness, yielding 9.0 mg.

The potencies of the samples obtained were determined by comparison with a standard sample of cephamycin C. Bio-assay and UV measurements indicated that the samples were approximately 50% pure cephamycin C.

Paper strip chromatography was carried out using Whatman No. 1 paper and n-butyl alcohol, acetic acid, methyl alcohol, water (4:1:1:2). The compound was detected by bioautographing against *Vibrio percolans* ATCC 8461 and *Pseudomonas stutzeri* ATCC 11607.

| | | Rf | |
|---|---|---|---|
| Sample | | ATCC 8461 | ATCC 11607 |
| 1) NRRL 5753 | | 0.2 | 0.14 |
| D-50 eluate | | 0.34 | |
| 2) NRRL 5735 | | 0.22 | 0.21 |
| Final product from Bio-Gel P-2 | | | |
| 3) Cephamycin C standard sample | | 0.22 | 0.22 |
| 4) Mix of 2 and 3 | | 0.22 | |

The major component of NRRL 5735 (Rf 0.22) with activity against *Vibrio percolans* ATCC 8461 cannot be distinguished from cephamycin C.

EXAMPLE 3

Isolation of Toyocamycin

Six liters of filtered broth (pH 7.6) obtained in accordance with Example I was adsorbed on 400 ml. of Dowex 1 × 2 Cl⁻ cycle resin. The adsorbate was washed with 500 ml. of water and then eluted with 70% aqueous methanol. A 500 ml. eluate fraction was collected and concentrated to dryness.

The above residue was dissolved in 9 ml. of hot methanol and filtered. The clear solution was allowed to cool to room temperature and then 21 ml. of water was added with stirring. The solution was placed in the refrigerator overnight to crystallize. The crystals were removed by filtration and dried one hour at 50°C. and 0.01 mm. of pressure. Yield 128 mg. Based on an estimated 80% overall yield, the above filtered broth contained approximately 15 μg/ml. of toyocamycin.

A comparison of the ultra-violet spectra of the isolated crystalline material and that published for toyocamycin is tabulated below:

| Isolated Material | | | Reported for Toyocamycin | |
|---|---|---|---|---|
| max. | $E_{1cm}^{1\%}$ | Solvent | max. | $E_{1cm}^{1\%}$ |
| 233 nm | 360 | Methanol | — | — |
| 278 | 520 | Methanol | — | — |
| 235 | 780 | 0.1N HCl | 235 | 760 |
| 272 | 545 | 0.1N HCl | 273 | 563 |
| 232 | 490 | 0.1N NaOH | 233 | 398 |
| 278 | 670 | 0.1N NaOH | 280 | 571 |

| Elemental Analysis* | | Calculated for $C_{12}H_{13}N_5O_4$ |
|---|---|---|
| Found | | |
| C | 49.45 | C 49.50 |
| H | 4.67 | H 4.50 |
| N | 23.76 | N 24.07 |
| O diff. | 22.12 | O 22.0 |

*Weight loss 100°C. 1 hr. 6.83%

We claim:

1. A method of producing an antibiotic mixture comprised of cephamycin C and toyocamycin which method comprises cultivating a cephamycin C and toyocamycin producing strain of *Streptomyces albogriseolus* in a culture medium containing assimilable sources of carbon and nitrogen under aerobic conditions until a substantial amount of said antibiotics are produced by said organism in the culture medium.

2. The method of claim 1 wherein the organism is *Streptomyces albogriseolus* NRRL 5735.

3. A method according to claim 1 additionally comprising recovering cephamycin C from said culture medium.

4. A method according to claim 1 additionally comprising recovering toyocamycin from said culture medium.

5. A method of producing the antibiotic cephamycin C which method comprises cultivating a cephamycin C producing strain of *Streptomyces albogriseolus* in a culture medium containing assimilable sources of carbon and nitrogen under aerobic conditions until a substantial amount of said antibiotic is produced by said organism in the culture medium.

6. The method of claim 5 wherein the organism is *Streptomyces albogriseolus* NRRL 5735.

7. A method according to claim 5 additionally comprising recovering cephamycin C from said culture medium.

8. A method of producing the antibiotic toyocamycin which method comprises cultivating a toyocamycin producing strain of *Streptomyces albogriseolus* in a culture medium containing assimilable sources of carbon and nitrogen under aerobic conditions under a substantial amount of said antibiotic is produced by said organism in the culture medium.

9. The method of claim 8 wherein the organism is *Streptomyces albogriseolus* NRRL 5735.

10. A method according to claim 8 additionally comprising recovering toyocamycin from said culture medium.

* * * * *

UNITED STATES PATENT OFFICE
CERTIFICATE OF CORRECTION

PATENT NO. : 3,914,158
DATED : October 21, 1975
INVENTOR(S) : EDWARD O. STAPLEY & JUSTO M. MATA It is certified that error appears in the above-identified patent and that said Letters Patent are hereby corrected as shown below:

Column 10, Claim 8, line 5, should read as follows:

"and nitrogen under aerobic conditions until a substan-".

Signed and Sealed this third Day of February 1976

[SEAL]

Attest:

RUTH C. MASON
Attesting Officer

C. MARSHALL DANN
Commissioner of Patents and Trademarks